United States Patent
Pawar et al.

(10) Patent No.: US 9,948,428 B2
(45) Date of Patent: Apr. 17, 2018

(54) METHOD AND SYSTEM FOR AGGREGATING MESSAGES

(71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Anoop K. Goyal, Overland Park, KS (US); Bhagwan Khanka, Bothell, WA (US); Duane Anthony Tomka, Wauwatosa, WI (US)

(73) Assignee: Sprint Spectrum L.P., Overland Park, KS (US)

( * ) Notice: Subject to any disclaimer, the term of this patent is extended or adjusted under 35 U.S.C. 154(b) by 103 days.

(21) Appl. No.: 15/204,552

(22) Filed: Jul. 7, 2016

(65) Prior Publication Data

US 2016/0359588 A1 Dec. 8, 2016

Related U.S. Application Data

(63) Continuation of application No. 12/146,887, filed on Jun. 26, 2008, now abandoned.

(51) Int. Cl.
*H04W 4/00* (2009.01)
*H04L 1/16* (2006.01)
(Continued)

(52) U.S. Cl.
CPC .......... *H04L 1/1628* (2013.01); *H04L 1/1607* (2013.01); *H04L 1/1692* (2013.01);
(Continued)

(58) Field of Classification Search
CPC . H04L 1/1628; H04L 61/6022; H04L 1/1607; H04L 1/1692; H04L 1/1812; H04L 2001/0093; H04W 84/042
See application file for complete search history.

(56) References Cited

U.S. PATENT DOCUMENTS 4,766,534 A 8/1988 DeBenedictis
5,374,952 A * 12/1994 Flohr .................... H04N 7/147
 348/14.08
(Continued)

FOREIGN PATENT DOCUMENTS

EP 0 981 221 2/2000
WO 2007059523 5/2007

OTHER PUBLICATIONS

Anker et al., "The Design of Xpand: A Group Communication System for Wide Area Networks," The Hebrew University of Jerusalem, Institute of Computer Science.
(Continued)

*Primary Examiner* — Afshawn Towfighi

(57) ABSTRACT

Methods and systems are disclosed that support the aggregation of acknowledgement messages and control messages. Advantageously, acknowledgement and negative acknowledgement indications for multiple client nodes are combined into a single aggregated message which is broadcast or multicast to the multiple client nodes. Based on unique identifiers assigned to each client node, client nodes are grouped such that the aggregated acknowledgement messages can be efficiently encoded to conserve both network capacity when they are transmitted, as well as processing capacity when they are parsed by the client nodes. If code division multiple access (CDMA) technology is used, the aggregated acknowledgment message can be transmitted without CDMA spreading to effectively broadcast or multicast it to multiple client nodes. A similar technique can be employed for the efficient broadcast or multicast of aggregated control messages.

20 Claims, 10 Drawing Sheets

(51) Int. Cl.
*H04L 1/18* (2006.01)
*H04L 29/12* (2006.01)
*H04L 1/00* (2006.01)
*H04W 84/04* (2009.01)

(52) U.S. Cl.
CPC ........ *H04L 1/1812* (2013.01); *H04L 61/6022* (2013.01); *H04L 2001/0093* (2013.01); *H04W 84/042* (2013.01)

(56) References Cited

U.S. PATENT DOCUMENTS

| | | | |
|---|---|---|---|
| 6,128,283 | A | 10/2000 | Sabaa et al. |
| 6,560,458 | B1 | 5/2003 | Ronkko |
| 6,647,002 | B1 * | 11/2003 | Suda .................. H04L 1/1642 370/322 |
| 6,925,132 | B2 | 8/2005 | Song et al. |
| 7,002,993 | B1 | 2/2006 | Mohaban et al. |
| 7,096,494 | B1 | 8/2006 | Chen |
| 7,720,903 | B1 * | 5/2010 | Huckins .................. H04L 12/18 709/200 |
| 2001/0012785 | A1 | 8/2001 | Esteves et al. |
| 2002/0137500 | A1 | 9/2002 | Brooking et al. |
| 2003/0037132 | A1 | 2/2003 | Abdollahi et al. |
| 2003/0041141 | A1 | 2/2003 | Abdelaziz et al. |
| 2004/0047348 | A1 | 3/2004 | O'Neill |
| 2004/0064693 | A1 | 4/2004 | Pabla et al. |
| 2004/0088348 | A1 | 5/2004 | Yeager et al. |
| 2004/0179475 | A1 | 9/2004 | Hwang et al. |
| 2004/0205105 | A1 | 10/2004 | Larsson et al. |
| 2004/0233918 | A1 | 11/2004 | Larsson et al. |
| 2005/0058151 | A1 | 3/2005 | Yeh |
| 2005/0111452 | A1 | 5/2005 | Mamillapalli et al. |
| 2005/0165949 | A1 | 7/2005 | Teague |
| 2005/0232231 | A1 | 10/2005 | Miyabe |
| 2006/0136614 | A1 | 6/2006 | Kakani et al. |
| 2006/0179356 | A1 | 8/2006 | Goodman et al. |
| 2006/0252443 | A1 | 11/2006 | Sammour et al. |
| 2007/0004347 | A1 | 1/2007 | Sondur |
| 2007/0070952 | A1 | 3/2007 | Yoon et al. |
| 2007/0106804 | A1 | 5/2007 | Bosschaert et al. |
| 2007/0110095 | A1 | 5/2007 | Attar et al. |
| 2007/0168822 | A1 | 7/2007 | Vitebsky et al. |
| 2007/0214400 | A1 | 9/2007 | Smith et al. |
| 2007/0277074 | A1 | 11/2007 | Yeo et al. |
| 2007/0280107 | A1 | 12/2007 | Ludwig et al. |
| 2007/0282911 | A1 | 12/2007 | Bantukul et al. |
| 2009/0016265 | A1 | 1/2009 | Katayama et al. |

OTHER PUBLICATIONS

Geunhwi Lim et al., IEEE 802.16 Broadband Wireless Access Working Group <http://ieee802.org/16>, Aggregated H-ARQ, Apr. 11, 2004, 6 pages.

International Searching Authority, International Search Report and Written Opinion dated Jan. 22, 2010, issued in connection with International Application No. PCT/US2009/045453, filed on May 28, 2009, 10 pages.

* cited by examiner

FIG. 2B
$$S*W1 = [\ 1\ -1\ \ 1\ \ 3\ \ 1\ -1\ -3\ -1\ \ 1\ \ 3\ \ 1\ -1\ ]$$
$$S1 = [\ \ 4\ \ \ \ \ \ \ -4\ \ \ \ \ \ \ \ 4\ ]$$
$$M1 = [\ 1\ -1\ \ 1\ ]$$
$$S*W2 = [\ 1\ \ 1\ -1\ \ 3\ \ 1\ \ 1\ \ 3\ -1\ \ 1\ -3\ -1\ -1\ ]$$
$$S2 = [\ \ 4\ \ \ \ \ \ \ \ 4\ \ \ \ \ \ \ \ -4\ ]$$
$$M2 = [\ 1\ \ 1\ -1\ ]$$
$$S*W3 = [\ 1\ -1\ -1\ -3\ \ 1\ -1\ \ 3\ \ 1\ \ 1\ \ 3\ -1\ \ 1\ ]$$
$$S3 = [\ -4\ \ \ \ \ \ \ \ 4\ \ \ \ \ \ \ \ 4\ ]$$
$$M3 = [\ -1\ \ 1\ \ 1\ ]$$

US 9,948,428 B2

METHOD AND SYSTEM FOR AGGREGATING MESSAGES

CROSS-REFERENCE TO RELATED APPLICATION

This application claims priority to U.S. patent application Ser. No. 12/146,887, filed Jun. 26, 2008, which is hereby incorporated by reference in its entirety.

BACKGROUND

In a communication system, an access node may comprise a device or set of devices that serve as a gateway that client nodes may use for exchange of information with a network. This information may take the form of voice, data, or some other media. The client nodes may be wireline or wireless components.

In some types of communication systems, an access node explicitly acknowledges each packet of information that the access node receives from a client node. For example, if the access node receives ten voice packets from a client node, the access node may transmit ten acknowledgement messages, one for each voice packet, to the client node. These voice packets may include a representation of a voice signal, error detection coding, error correction coding, and possibly other information. By processing information in acknowledgment messages, the client node is able to determine if one or more of the voice packets it transmitted were not received by the access node. In response to such a determination, the client node may retransmit one or more voice packets to the access node.

There are at least two ways that a packet can be "lost" between a client node and the access node. The packet may be truly lost if it never arrives at the access node. Alternatively, the packet may arrive at the access node, but when the access node checks error detection coding in the packet, it finds that the packet has been corrupted. In this case, the access node may discard the packet, so the packet is effectively lost.

Such an acknowledgment-based transmission scheme is typically referred to as automatic repeat request (ARQ). For example, in one variation of ARQ referred to as stop-and-wait, a client node transmits a packet to an access node, then waits to receive an acknowledgement from the access node before transmitting another packet. If the client node does not receive an acknowledgement within a pre-determined time period or if the client node receives a negative acknowledgement, the client node may retransmit the packet.

Hybrid ARQ is a variation that can be applied to any type of ARQ. Using hybrid ARQ, a client node may divide a packet into multiple sub-packets, and transmit each sub-packet individually. These sub-packets may include redundant information for purposes of forward error correction. Thus, if the access node checks the error detection code of a sub-packet and finds that the sub-packet has been corrupted, the access node may be able to rebuild the correct packet from the redundant information. Nonetheless, some sub-packets may not include redundant information. For example, a given sub-packet may include only information and error detection codes, while subsequent sub-packets may include redundant information relating to the information in the given packet. Communication systems with lossy channels, such as wireless networks, may benefit from hybrid ARQ.

It is common for an access node to serve multiple client nodes, perhaps tens or hundreds of client nodes. Additionally, is it common for certain types of networks to support broadcast or multicast channels that can be used to transmit a packet such that the packet can be received by multiple destinations. Thus, it is possible for some access nodes to combine multiple acknowledgement messages destined for multiple clients into a single aggregated acknowledgement message (AAM). The access node then transmits this AAM to some or all of the client nodes using a broadcast or multicast channel. A client node that receives an AAM may parse the message to find the acknowledgement data pertaining to itself. The client node may discard acknowledgment data in the AAM that pertains to other client nodes.

By combining individual acknowledgment messages into a single AAM, network capacity is conserved, as the overhead associated with transmitting a large number of acknowledgment messages is eliminated. This technique is especially beneficial to an access node that is receiving packets from a potentially large number of client nodes.

OVERVIEW

Disclosed herein are methods and systems for improving aggregated acknowledgement schemes using ARQ-based or ARQ-like protocols. While these methods and systems are directed to high-speed wireless networks, they are applicable to any type of network that supports aggregating acknowledgements.

For purposes of simplicity, the terms "packet" and "sub-packet" will be used somewhat interchangeably. While the specific embodiment of hybrid ARQ divides packets into sub-packets and then transmits and acknowledges these individual sub-packets, the methods and systems described herein are not limited to operating on sub-packets, and may operate at the level of packets instead.

In order to improve the efficiency of encoding and processing AAMs, client nodes may be divided into groups based on an identifier assigned to each client that is unique for all client nodes served by a given access node or radio access network. The unique identifiers of clients within a group may be sequentially ordered and contiguous with respect to one another. When an access node receives a packet from each client in any given group during a predetermined time period, the access node may respond to all of the clients of the group with an AAM that contains acknowledgement data for each client in the group. If the access node does not receive a packet from all of the clients in the group within the predetermined time period, the access node may instead acknowledge each received packet individually.

The AAM may be encoded efficiently so that it requires very few bits of overhead to indicate the group and/or the associated client nodes to which it pertains. Furthermore, the acknowledgement data may be organized according to the ordering of the unique identifiers of the client nodes in the group so that each client node may efficiently find its respective acknowledgement data in an AAM. Advantageously, in CDMA networks, the acknowledgement data may be transmitted without CDMA spreading, thus effectively broadcasting or multicasting the AAM to a plurality of client nodes using only a single message.

An AAM may also contain control bits transmitted from an access node to a group of client nodes. Alternatively, control bits for multiple client nodes can be combined into a separate aggregated control message (ACM) and either broadcast or multicast to all client nodes in the group independently from the AAM. In cases where each of the client nodes in a given group are to be transmitted distinct control bits, these bits may represented as a series of control bits in an ACM. In cases where all of the client nodes in a given group are to be transmitted identical control bits, these bits may represented as a single set of control bits in an ACM.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 2A is an illustration of communication signal encoding;

FIG. 2B is an illustration of communication signal decoding;

DESCRIPTION

While the methods and systems described herein are potentially applicable to any network that supports broadcasting or multicasting of acknowledgement messages, the following descriptions are directed to wireless networks for purposes of example and illustration.

1. Client Nodes in Wireless Communication Networks

Figure 1:
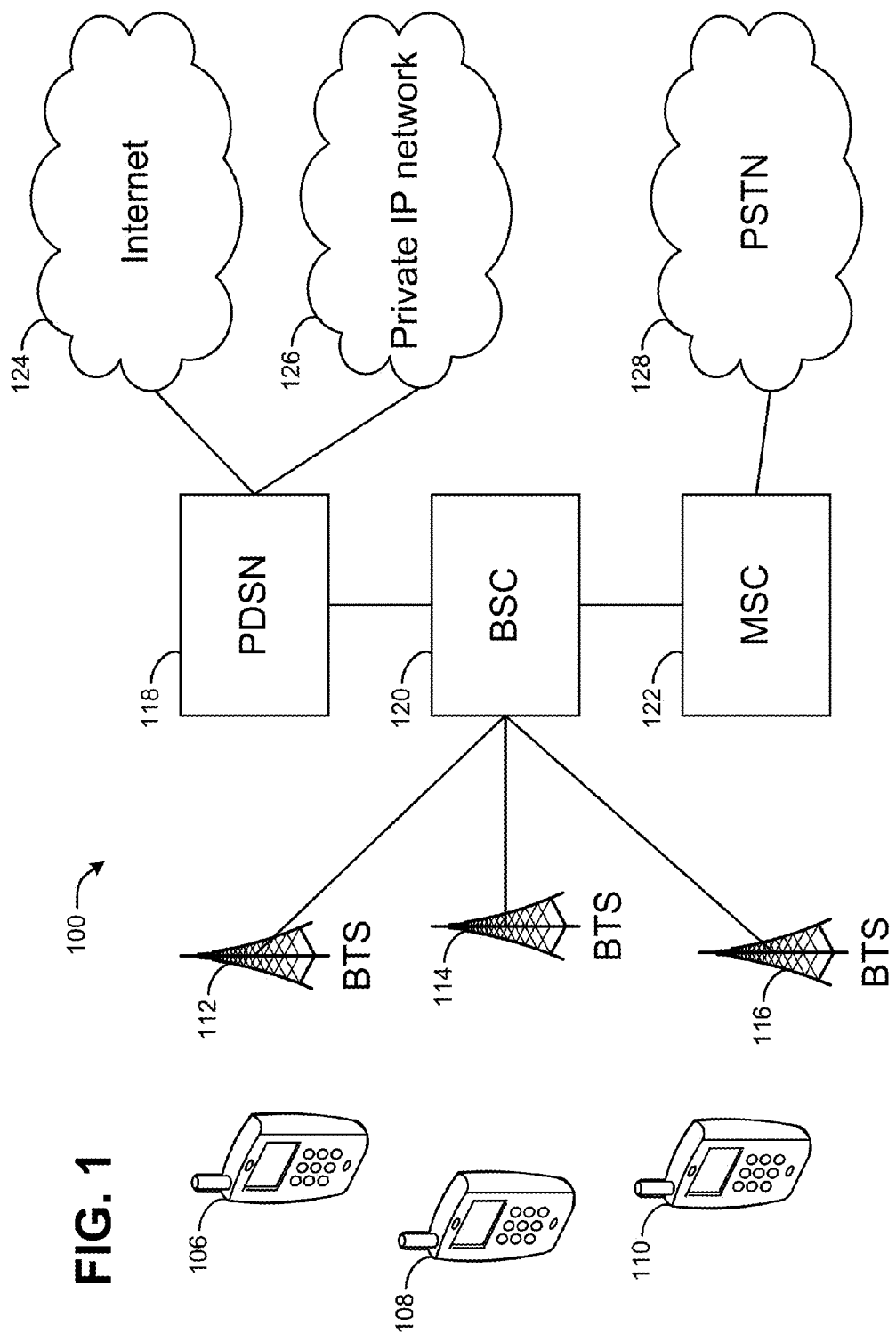
FIG. 1 is a block diagram of a communication network in accordance with an exemplary embodiment.

FIG. 1 is a simplified block diagram of an exemplary communication network 100, in which exemplary embodiments may be employed. Network 100 includes base transceiver stations (BTSs) 112, 114, 116 that can communicate with client nodes 106, 108, 110 via a plurality of wireless coverage areas. Client nodes 106, 108, 110 could be wireless telephones, wireless personal digital assistants, wirelessly equipped laptop computers, wireless routers, or other types of mobile or fixed wireless devices.

BTSs 112, 114, 116 radiate to define the wireless coverage areas. Each wireless coverage area may provide air interface access to client nodes 106, 108, 110 and any other client nodes served by the wireless coverage area. A single BTS 112, 114, 116 may define one or more wireless coverage areas. The air interface may include forward links from a BTS to client nodes 106, 108, 110 and reverse links from client nodes 106, 108, 110 to a BTS. Client nodes 106, 108, 110 exchange signaling, voice, data, video, or other media with the BTS through the forward and reverse links. In this regard, client nodes 106, 108, 110 may use the wireless coverage areas defined by BTSs 112, 114, 116 to communicate with one or more endpoints, e.g., other client nodes, e-mail servers, world wide web servers, gaming servers, media servers, media gateways, or location-based services, via a packet-switched network (e.g., the Internet 124 or private IP network 126), and/or a circuit-switched network, such as the public switched telephone network (PSTN) 128. For example, BTSs 112, 114, 116 may be communicatively coupled to a base station controller (BSC) 120. BSC 120 may, in turn, be communicatively coupled to packet-switched networks 124, 126 via a packet data serving node (PDSN) 118. Alternatively or additionally, BSC 120 may be communicatively coupled to PSTN 128 via a mobile switching center (MSC) 122.

Although FIG. 1 shows only three BTSs 112, 114, 116, network 100 may include fewer or more than three BTSs. These BTSs may be communicatively coupled to BSC 120 or to other network elements that are communicatively coupled to packet-switched networks 124, 126 and/or PSTN 128. Furthermore, client nodes 106, 108, 110 may be able to transfer ongoing communication sessions from one BTS to another in a handoff process. Network 100 may also include multiple BSCs 120, PDSNs 118, and MSCs 122. The combination of network elements including BTSs 112, 114, 116, BSC 120, PDSN 118, and MSC 122 may be collectively referred to as a radio access network (RAN). However, a RAN may also be defined to comprise more or fewer elements. For example, a RAN may comprise a single BTS and a single BSC. Furthermore, these elements may be combined with one another; for example, a BTS and a BSC may be physically co-located or may be components of the same physical element.

Regardless of the composition of the RAN, at least one entity within the RAN serves as an access node by acknowledging packets and/or sub-packets transmitted by the client nodes in the RAN's coverage area. The acknowledging entity may be a BTS 112, 114, 116, a BSC 120, or some other device.

The entity or entities of the RAN preferably include at least one processor, data storage, and program instructions stored in the data storage and executable by the processor to carry RAN functions described herein. Similarly, a client node preferably includes at least one processor, data storage, and program instructions stored in the data storage and executable by the processor to carry out client node functions described herein. Furthermore, the client nodes and the RAN may operate in accordance to various types of wireless protocols, such as Code Division Multiple Access (CDMA), Worldwide Interoperability for Microwave Access (WIMAX), Universal Mobile Telecommunications System (UMTS), or other protocols now known or later developed.

2. CDMA Encoding and Decoding

CDMA wireless networks are exemplary types of communication systems in which the methods and systems herein can be implemented. Commercially deployed cellular CDMA systems are generally based on communication standards developed by the Third Generation Partnership Project 2 (3GPP2). 3GPP2 has supported the evolution and advancement of CDMA voice and data systems from low-speed systems to advanced integrated voice and data systems. One of the most recent commercially available CDMA systems is Evolution Data Only, Revision A (EVDO Rev. A), wherein a combination of CDMA and time division multiple access (TMDA) technologies can be employed to provide capacity on the order of megabits per second to client nodes.

While the discussion herein is directed to EVDO Rev. A CDMA systems, the methods and procedures introduced may be applied to older or newer CDMA systems.

In a CDMA network, multiple communication channels can utilize the same carrier frequency without interference. Each channel is assigned a unique code from a set of mathematically orthogonal codes. Each code is a series of bits that has a very small or negligible cross-correlation with all other codes in the set. A code is applied to messages transmitted on the channel at a "chip rate" of some multiple of the messages' bit rate. For example a CDMA system with a chip rate of four means that four code bits will be applied to each bit of a message. A message is transmitted on a CDMA channel by multiplying repeating patterns of a channel's code with the message. Thus, the message is "spread" according to the code and the system's chip rate. Messages on all channels are additively combined and then transmitted simultaneously on the same carrier frequency.

FIG. 2A illustrates processes of transmitting messages according to CDMA. These processes 200, 210, 220, 230 operate at the bit level and may require that each binary zero (0) is transformed into a value of one (1), and each binary one (1) is transformed into a value of negative one (−1) for purposes of manipulation. The processes in FIG. 2A assume a chip rate of four, but other chip rates may be used.

In process 200, a message M1 is depicted as three bits long for simplicity of illustration. In practice, a message transmitted using CDMA is typically much longer than three bits and represents information, such as voice or data, being transmitted to or received from a client node. Modified message M1' is created by spreading message M1 according to the chip rate of four. In other words, modified message M1' represents each bit of message M1 being replaced by four bits of the same value. Orthogonal code W1 is a repeating four bit sequence. Modified message M1' is multiplied bitwise with code W1 to create spread code C1. Similar procedures are illustrated in process 210 for a message M2 and an orthogonal code W2, and in process 220 for a message M3 and an orthogonal code W3. It can readily be demonstrated that orthogonal codes W1, W2, and W3 are in fact orthogonal with one another, as the bitwise cross-correlation of any two of these codes is zero. In process 230, the three resulting spread codes, C1, C2, and C3, are added bitwise to create a signal S. Signal S is then transformed into a bit stream and modulated onto a carrier frequency for transmission to the intended receivers of messages M1, M2, and M3.

A receiver may decode a message from a particular CDMA channel by multiplying the received signal with the channel's code, then adding the resulting bits in each chip period. FIG. 2B illustrates processes of decoding messages according to CDMA. First, a modulated representation of signal S is received and demodulated. In process 240, signal S is then multiplied bitwise with orthogonal code W1. In turn, the resulting values in each four-symbol chip period are then added, thus forming modified signal S 1. Finally, each symbol in modified signal Si is compared to a threshold value in order to recreate the original message. In this system, if the symbol is of a value less than zero, it is assigned a −1, and if the symbol is of a value greater than zero, it is assigned a 1. Thus, the originally transmitted message, M1, is decoded. Similar procedures are illustrated in processes 250 and 260 to decode messages M2 and M3, respectively. While not shown in FIG. 2B, each negative one (−1) in message M1 may be transformed into a one (1) and each one (1) in message M1 may be transformed into a zero (0) to form a bit stream.

3. Hybrid ARQ in CDMA

In CDMA networks, voice or data packets transmitted on a reverse link traffic channel typically include error correcting codes. These codes insert redundant information into a voice or data bit stream so that the access node has a higher probability of being able to properly decode the packet. Popular types of error correcting codes include Reed-Solomon codes and turbo codes, and CDMA systems may use these or other types of error correcting codes.

Typically, a client node will apply an error correcting code to a voice or data packet, then divide the packet into a number of sub-packets. Preferably, the client node transmits each sub-packet independently to the access node according to ARQ procedures.

Due to the fact that redundant information is encoded in each sub-packet, it is possible that the access node may be able to decode the entire transmitted packet before it receives all of the sub-packets for that packet. For example, assuming that the number of sub-packets per packet is four, a client node may divide a packet into sub-packets 1 through 4 and then may transmit them according to ARQ procedures. After receiving each sub-packet, the access node will attempt to decode the entire original packet. It may be possible for the access node to do so after it receives sub-packets 1 and 2. In this case, the access node will instruct the client node to not transmit sub-packets 3 and 4, thus avoiding unnecessary utilization of network capacity. Such a benefit may be referred to as early termination gain.

Hybrid ARQ in CDMA networks facilitate this process. An access node uses three bits transmitted in the forward direction to indicate whether early termination gain can be applied to a packet. The H-ARQ bit (not to be confused with the overall process of hybrid ARQ) is used to acknowledge (ACK) or negatively acknowledge (NACK) the first three sub-packets of a packet. The L-ARQ bit is used to ACK or NACK the fourth sub-packet of a packet. The P-ARQ bit is used to ACK or NACK the full packet.

Figure 3:
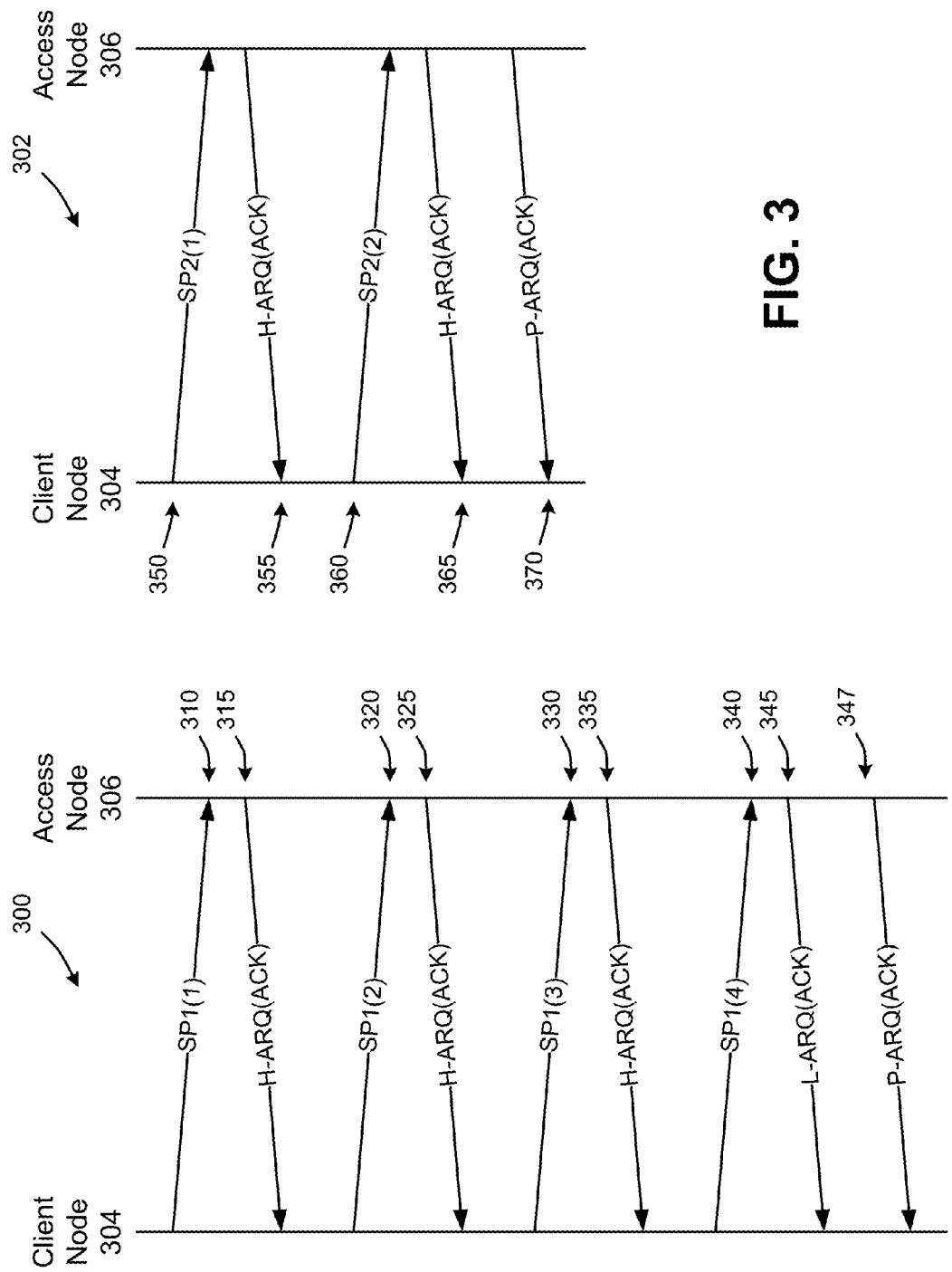
FIG. 3 is a message flow depicting an exemplary embodiment of hybrid ARQ.

FIG. 3 provides examples of hybrid ARQ procedures in CDMA. Client node 304 transmits two series of sub-packets to access node 306. Each series represents the transmission of several sub-packets that comprise a packet. The first series 300 serves as an example of sub-packet transmission without early termination gain, while the second series 302 serves as an example of sub-packet transmission with early termination gain. For purposes of simplicity, NACKs transmitted by access node 306 in response to sub-packets transmitted by client node 304 are not shown.

In first series 300, client node 304 transmits the first sub-packet, SP1(1) 310. Access node 306 responds with a H-ARQ ACK 315 to indicate that SP1(1) 310 was successfully received. Similarly, client node 304 transmits SP1(2) 320 and access node 306 responds with an H-ARQ ACK 325, and client node 304 transmits SP1(3) 330 and again, access node 306 responds with an H-ARQ ACK 335. Client node 304 transmits SP1(4) 340 and access node 306 responds with an L-ARQ ACK 345 to indicate that SP1(4) 340 is the final sub-packet of the packet. After transmitting L-ARQ ACK 345, the access node reassembles the four sub-packets into a packet. This process is successful, so access node 306 transmits a P-ARQ ACK 347 to indicate that access node 306 has successfully received the entire packet.

In second series 302, client node 304 transmits the first sub-packet, SP2(1) 350. Access node 306 responds with an H-ARQ ACK 355 to indicate that SP(1) 350 was successfully received. However, after client node 304 transmits the second sub-packet, SP2(2) 360, access node 306 responds with an H-ARQ ACK 365, followed by a P-ARQ ACK 370. The P-ARQ ACK 370 indicates to client node 304 that access node 306 was able to decode the packet based on a combination of SP2(1) 350 and SP2(2) 360 and that client node 304 does not need to transmit any further sub-packets.

In both first series 300 and second series 302, access node 306 may transmit ACKs and NACKs at predetermined offsets from when client node 304 transmits the associated sub-packet. Thus, client node 304 can use these offsets to match ACKs and NACKs to the sub-packets these ACKs and NACKs are intended to acknowledge or negatively acknowledge, respectively.

While the example in FIG. 3 illustrates the use of four sub-packets per packet, another number of sub-packets per packet could be used as well. Similarly, while FIG. 3 illustrates the use of the H-ARQ, L-ARQ, and P-ARQ bits to facilitate early termination gain, a different number of bits, configuration of bits, or sequence or types of messages could achieve the same goals.

4. CDMA MAC Channels

In many CDMA systems, the orthogonal codes used in the forward direction are Walsh codes, while the orthogonal codes used in the reverse direction are pseudo noise (PN) codes. Client nodes are each assigned a unique medium access control identifier (MAC_ID), corresponding to their assigned Walsh code. In EVDO Rev. A, MAC_IDs comprise an integer between 0 and 127, with MAC_IDs 6-63 and 72-127 being available to be assigned to client nodes. A MAC_ID may serve as a dynamically assigned address for the client node. Thus, there typically is a unique mapping in each of the forward and reverse directions between an orthogonal code, a MAC_ID, and a client node. However some orthogonal codes and/or MAC_IDs may be shared by more than one client node.

CDMA standards allow a base station to be deployed to support multiple sectors. For example, instead of using an omni-directional, 360-degree antenna, a base station can use three antennae, each transmitting and receiving signals over sectors of 120 degrees. Each sector may support a number of traffic channels and a number of signaling channels. The traffic channels may support bearer traffic and the signaling channels may facilitate functions including paging, hand-offs, power control, and synchronization.

One of the forward direction signaling channels in EVDO Rev. A is the MAC channel. Each client node is assigned a MAC channel and a MAC_ID associated with this channel. The MAC channel supports hybrid ARQ signaling, and further comprises the reverse power control (RPC) sub-channel and the data rate control lock (DRCLock) sub-channel. The RPC sub-channel may be used to control the power that the client node uses to transmit in the reverse direction. The DRCLock sub-channel may be used to indicate the quality of the reverse link DRC channel.

Figure 4:
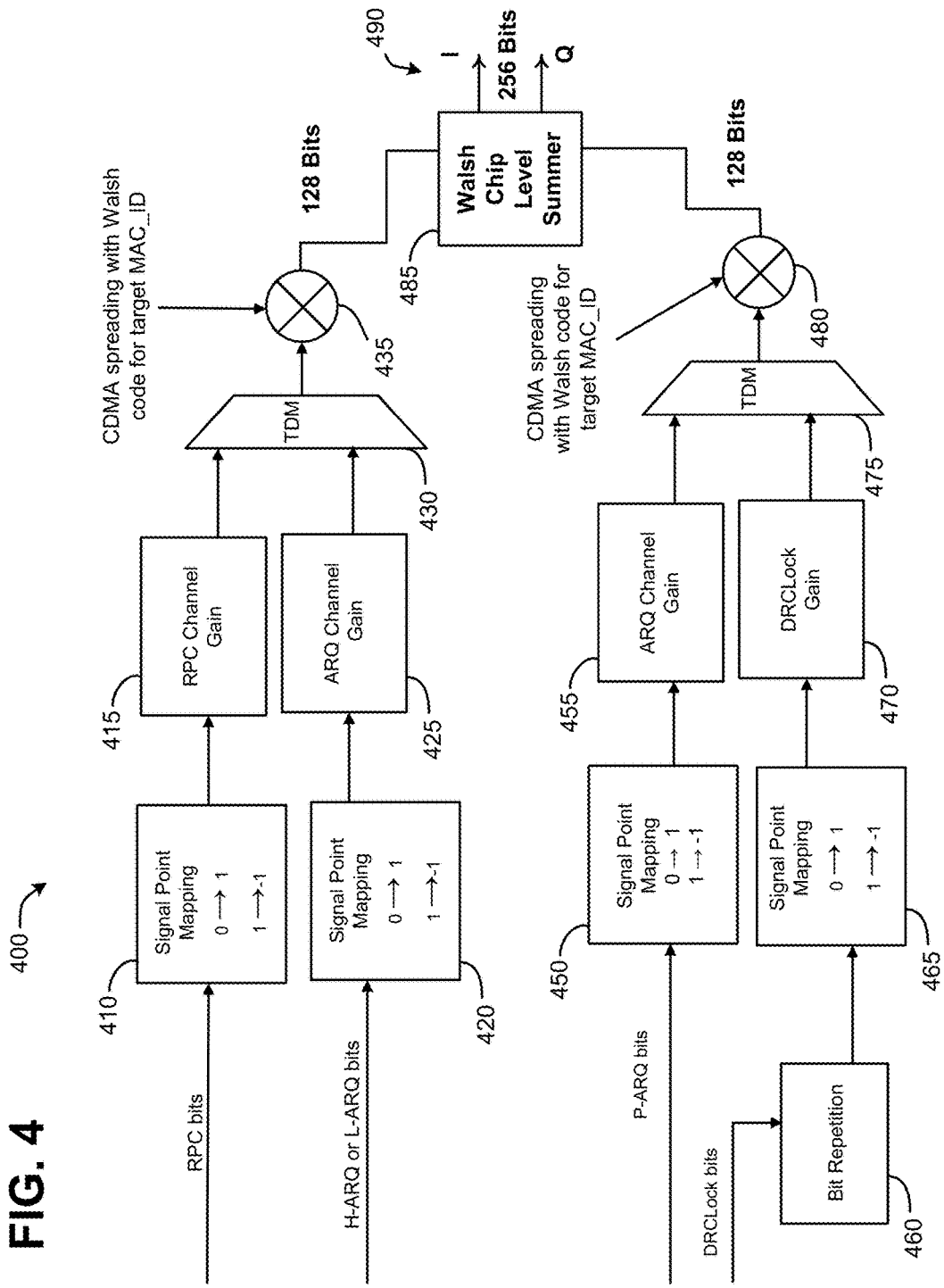
FIG. 4 is a signal flow schematic illustrating a method for transmitting acknowledgements on a CDMA medium access control channel.

FIG. 4 depicts a method 400 for transmitting acknowledgment messages on a CDMA MAC channel. In particular, FIG. 4 provides a representation of how RPC, DRCLock and ARQ bits are multiplexed and encoded on a CDMA MAC channel in the forward direction to a particular target client node. An RPC bit stream serves as input to a signal point mapping function 410, while an H-ARQ/L-ARQ bit stream serves as input to signal point mapping function 420, a P-ARQ bit stream serves as input to signal point mapping function 450, and a DRCLock bit stream, after being passed through bit repetition function 460, serves as input to signal point mapping function 465. The purpose of signal point mapping functions 410, 420, 450, and 465 is to transform a binary bit stream into a format in accordance with CDMA encoding by converting zeros (0) into ones (1) and converting ones (1) into negative ones (−1).

After the bit streams are converted in signal point mapping functions 410, 420, 450, and 465, they are passed through channel gain functions 415, 425, 455, and 470, respectively. Outputs from channel gain functions 415 and 425 are combined by time-division multiplexor 430, then sent to CDMA spreader 435, where the bitstream is spread using the Walsh code associated with the target client node's MAC_ID. Similarly, outputs from channel gain functions 455 and 470 are combined by time-division multiplexor 475, then sent to CDMA spreader 480, where the bitstream is spread using the Walsh code associated with the target client node's MAC_ID. The CDMA spreaders, 435 and 480, use 128-bit Walsh codes in order to support the 128 possible MAC_IDs in EVDO Rev. A. The 128 bits of output from the two CDMA spreading functions, 435 and 480 are combined in a Walsh chip level summer 485 and the resulting 256-bit output is modulated onto the in-phase (I) and quadrature-phase (Q) components of the carrier frequency.

5. Aggregating ARQ Messages

While the methods and systems described above work reasonably well when a relatively small number of client nodes are served by an access node, as the number of client nodes per access node increases, the CDMA MAC channel hybrid ARQ scheme becomes less efficient. For example, suppose that 56 client nodes are transmitting packets on their respective reverse traffic channels. For each sub-packet of each packet from each client node, the access node has to transmit at least one hybrid ARQ ACK or NACK message. Under the scheme described above, each hybrid ARQ message requires 256 bits. Thus, if each client node transmits a sub-packet at approximately the same time, the access node must transmit 14,336 bits of hybrid ARQ information across 56 different ARQ messages. However, hybrid ARQ information can be more efficiently encoded.

Instead of transmitting individual ARQ messages to each client node, the access node may aggregate the ARQ information for some number of client nodes into a single, common ARQ message that is then broadcast or multicast to these clients. An additional goal is to be able to format the aggregated acknowledgement message (AAM) in such a way that it uses a small number of bits in an arrangement that is simple to decode. As a result, network capacity is conserved while client nodes may spend relatively few CPU cycles processing each AAM. Note that while the AAM is referred to as an aggregated acknowledgement message, it may contain indications of negative acknowledgements as well.

Figure 5:
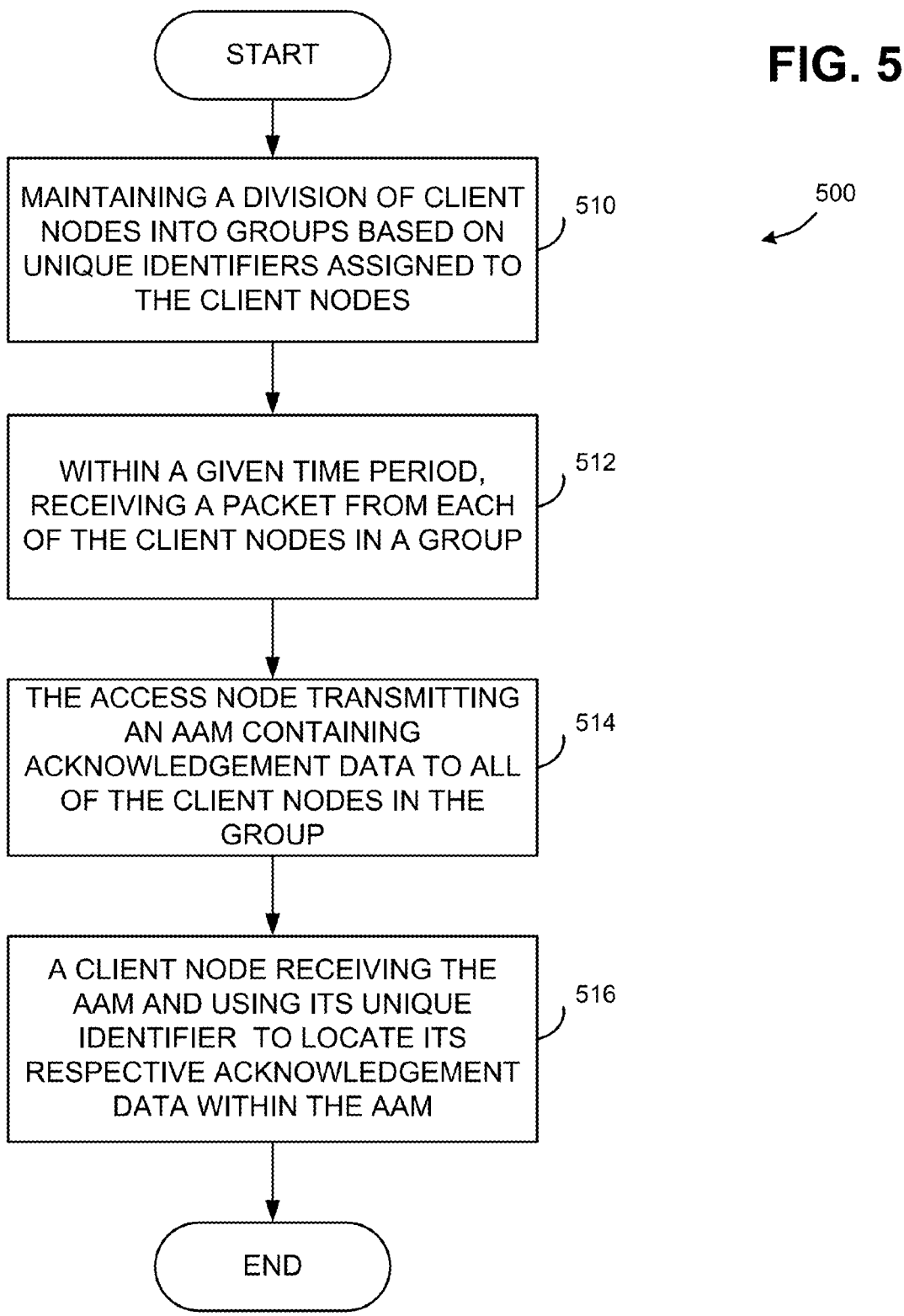
FIG. 5 is a flow chart depicting a method in accordance with an exemplary embodiment.

FIG. 5 is a flow chart depicting a method 500 for aggregating acknowledgement messages. At step 510 a communication system maintains a division of client nodes into groups based on unique identifiers that are assigned to these client nodes. This division is preferably maintained in the access node, but may be maintained in other devices such as a database, server, or adjunct node that is coupled to the access node. In a wireless communication network the division may be maintained in any of the infrastructure components in FIG. 1, such as a BTS 112, 114, 116, a BSC 120, an MSC 122 or a PDSN 118. Client nodes may either be explicitly notified of their group by an access node, or the group assignment may be implicit and the client nodes may be able to determine their group assignment from an AAM. For an example of bit encodings that an access node may use to implicitly indicate a group in an AAM, see FIGS. 7A, 7B, and 8.

The unique identifiers assigned to the client nodes are preferably CDMA MAC_IDs, but other types of unique identifiers may also be used. Preferably the unique identifiers are sequentially numbered and client nodes are assigned to groups based on the numbering of their unique identifiers. For example, as noted above, EVDO Rev. A client nodes may have MAC_IDs assigned from the ranges 6-63 and 72-127. These MAC_IDs may be dynamically assigned when a client node becomes associated with an access node, or may be assigned by some other means. The MAC_IDs can also serve as unique client node identifiers and as the basis for dividing the client nodes into groups. One such division can be based on assigning client nodes with contiguously-numbered MAC_IDs to groups of a particular size; for instance, an access node may be configured to assign 5 client nodes to a group. Thus, the access node may assign the client nodes with MAC_IDs 6-10 into a first group, the client nodes with MAC_IDs 11-15 into a second group, and so on.

At step 512, an access node detects that it has received, within a given time period, a packet from each of the client nodes in a given group. These packets may be sub-packets transmitted according to EVDO Rev. A hybrid ARQ procedures, or may be transmitted or formatted according to other procedures. At step 514, the access node transmits a single AAM that contains acknowledgement data associated with all of the client nodes in the group. This transmission may be broadcast to all client nodes or multicast to just the client nodes in the group. Preferably, the AAM includes (1) a preamble indicating that the AAM contains aggregated acknowledgements, (2) a group identifier indicating the group of client nodes to which the acknowledgements relate, and (3) a series of acknowledgements, each acknowledging a sub-packet transmitted by one of the client nodes within the given group. The group identifier is preferably a compact representation of a group of client nodes rather than a list of the unique client node identifiers of each client node in the group. The series of acknowledgements is preferably organized according to the sequential numbering of the client nodes' MAC_IDs.

At step 516, a client node receives the AAM and the client node uses its unique identifier to locate its respective acknowledgement data within the AAM. Preferably, the client node (1) parses the preamble to determine that the message contains aggregated acknowledgements, (2) parses the group identifier and determines that the AAM is directed to the group that the client node was assigned to, and (3) uses its MAC_ID to determine which bits in the AAM contains the client node's acknowledgment data.

Figure 6:
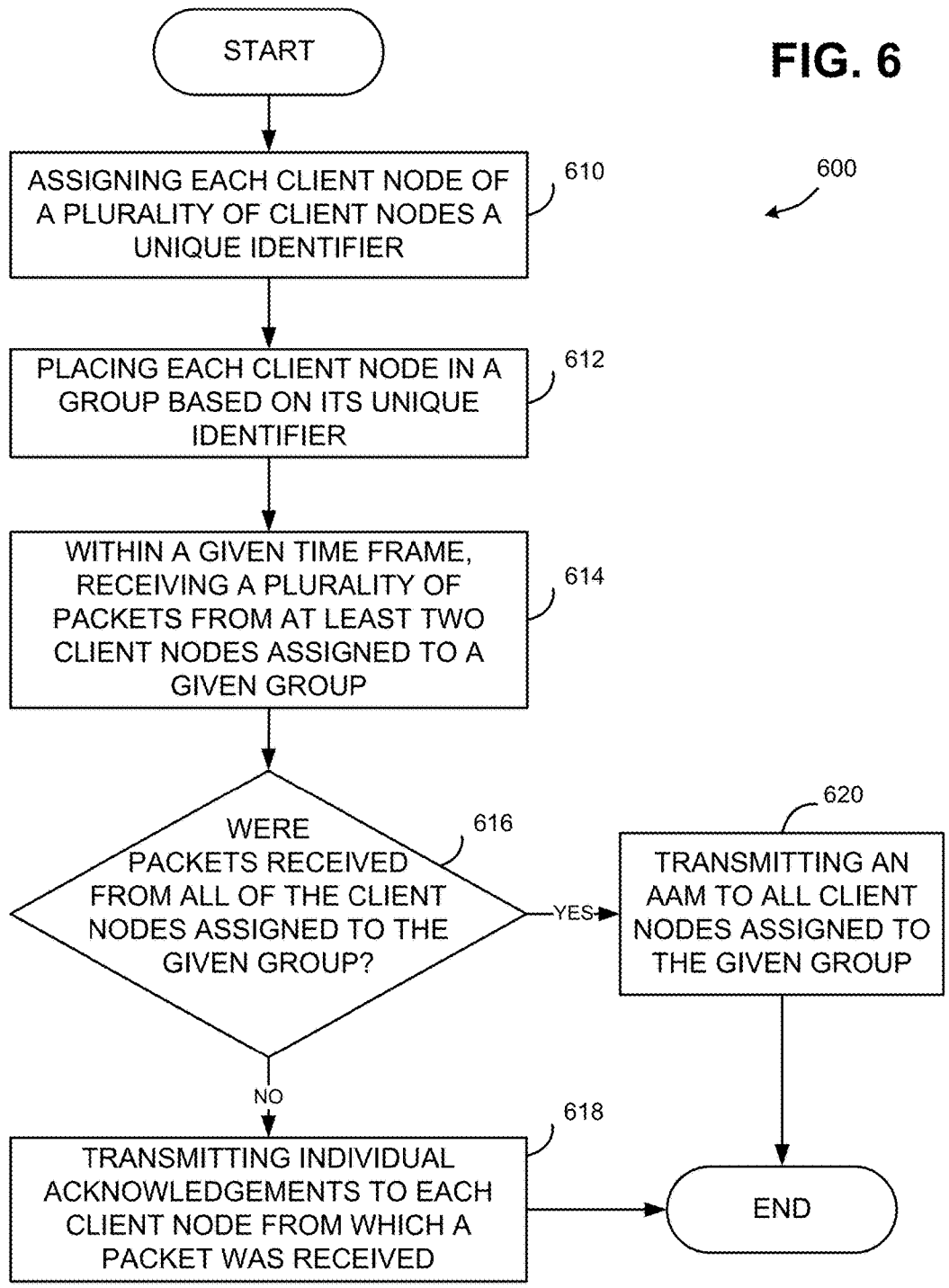
FIG. 6 is a flow chart depicting a method in accordance with an exemplary embodiment.

FIG. 6 is a flow chart of another method 600 for aggregating acknowledgement messages. At step 610 each client node of a plurality of client nodes is assigned a unique identifier. The unique identifiers assigned to the client nodes are preferably CDMA MAC_IDs, but other types of unique identifiers may also be used. Preferably the unique identifiers are sequentially numbered. At step 612 each client node is placed in a group based on its unique identifier. For example, as noted above, EVDO Rev. A client nodes may have MAC_IDs assigned from the ranges 6-63 and 72-127.

At step 614, a plurality of packets from at least two client nodes assigned to a given group are received within a given time period. These packets may be sub-packets transmitted according to EVDO Rev. A hybrid ARQ procedures, or the packets may be transmitted or formatted according to other procedures. At step 616, a determination is made as to whether packets were received from all of the client nodes assigned to the given group. If this is not the case, then, at step 618, individual acknowledgement messages are transmitted to each client node from which a packet was received. If this is the case, then at step 620 a single AAM is transmitted to all client nodes assigned to the given group. This transmission may be broadcast to all client nodes or multicast to just the client nodes in the given group. As described above, the AAM preferably includes (1) a preamble indicating that the AAM contains aggregated acknowledgements, (2) a group identifier indicating the given group of client nodes to which the acknowledgements relate, and (3) a series of acknowledgements, each acknowledging a packet transmitted by one of the client nodes within the given group.

6. Client Node Groupings for AAM and ACM Encoding and Transmission

In accordance with method 500 and method 600, it may be advantageous to group client nodes based on a sequential ordering of their unique identifiers. Doing so allows AAMs to be efficiently encoded by access nodes and efficiently decoded by client nodes. By encoding AAMs using relatively few bits to indicate the group of client nodes that the AAMs are directed to and the acknowledgment data for these client nodes, the AAMs will be relatively simple for client nodes to parse. Thus, client node CPU utilization may be reduced. Furthermore, if a client node is a battery-powered wireless device, reducing the number of bits that the client node needs to receive and process may extend the client node's battery life.

Exemplary embodiments of AAM encodings are presented in FIGS. 7A, 7B, 7C and 8. These embodiments encode a group identifier as sequences of bits that denote the group size and the group number, respectively. These embodiments further encode the acknowledgements and negative acknowledgments directed to each client node in a compact fashion, using only two bits. Additionally, the acknowledgements and negative acknowledgments are arranged in the sequential order of the client nodes' MAC_IDs, so that each client node can quickly determine which bits in the AAM contain the client node's respective acknowledgement data.

Figure 7A:
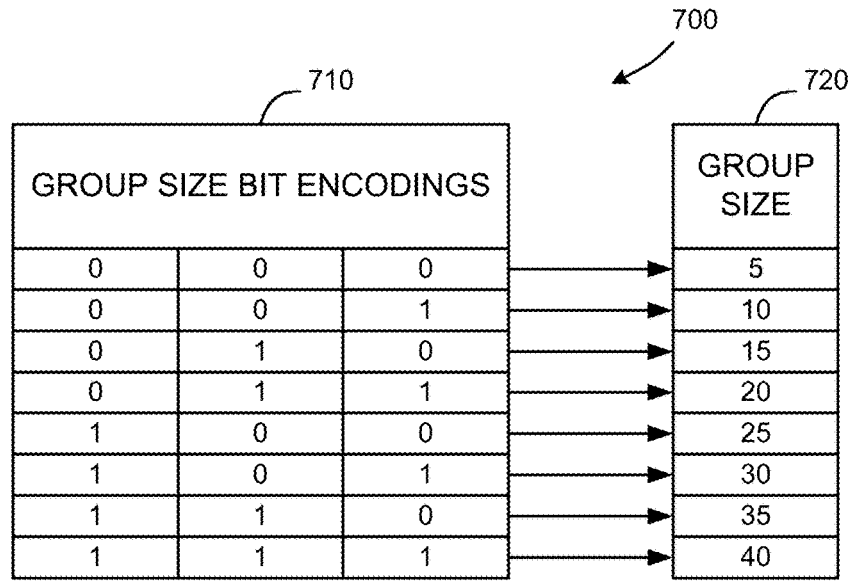
FIG. 7A is an illustration of a bitwise encoding of information in accordance with an exemplary embodiment.
Figure 7B:
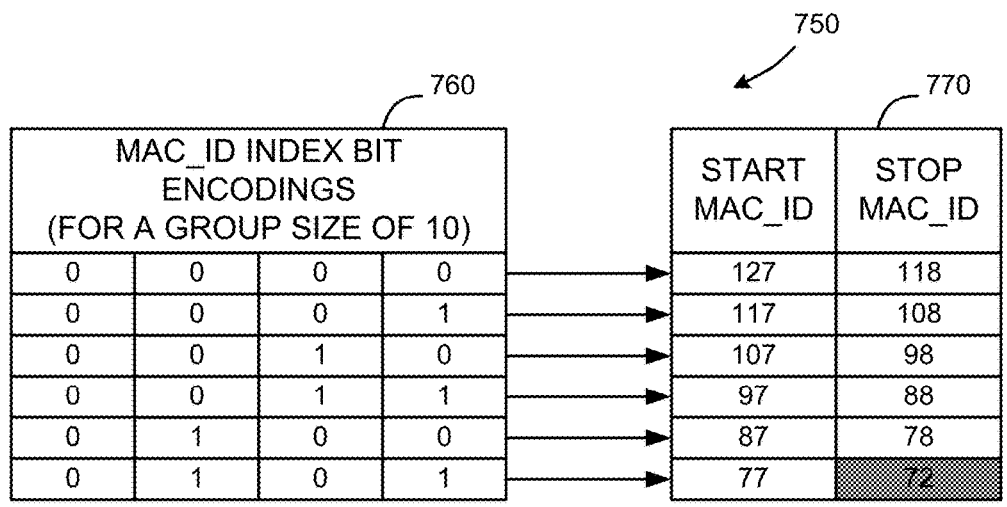
FIG. 7B is an illustration of a bitwise encoding of information in accordance with an exemplary embodiment.

FIG. 7A depicts a set of exemplary mappings 700 of group size bit encodings 710 to group sizes 720. Thus, for instance, a group size bit encoding 710 of 001 indicates a group size of 10 client nodes, while a group size bit encoding 710 of 011 indicates a group size of 20 client nodes. Furthermore, FIG. 7B depicts a set of exemplary mappings 750 of MAC_ID index bit encodings 760 for a group size of 10 to start and stop MAC_IDs 770. Each MAC_ID index bit encoding 760 is associated with a start MAC_ID. The group size, as indicated in the group size bit encoding 710, determines a stop MAC_ID. The start and stop MAC_IDs represent a contiguous range of MAC_ID values that are used to group client nodes. Thus, for instance, a MAC_ID index bit encoding 760 of 0000 combined with a group size bit encoding 710 of 001 represents MAC_IDs 127 through 118, inclusive. Similarly, a MAC_ID index bit encoding 760 of 0001 combined with a group size bit encoding 710 of 001 represents MAC_IDs 117 through 108, inclusive. In these embodiments the start MAC_ID is higher than the stop MAC_ID, but alternate embodiments may comprise the start MAC_ID being lower than the stop MAC_ID. Furthermore, the number of MAC_IDs and the exact values of the MAC_IDs may be different from the values presented in FIG. 7B. When the number of MAC_IDs available for client nodes is not divisible by the group size, at least one group of MAC_IDs may have fewer or more MAC_IDs than the other groups of MAC_IDs.

Figure 7C:
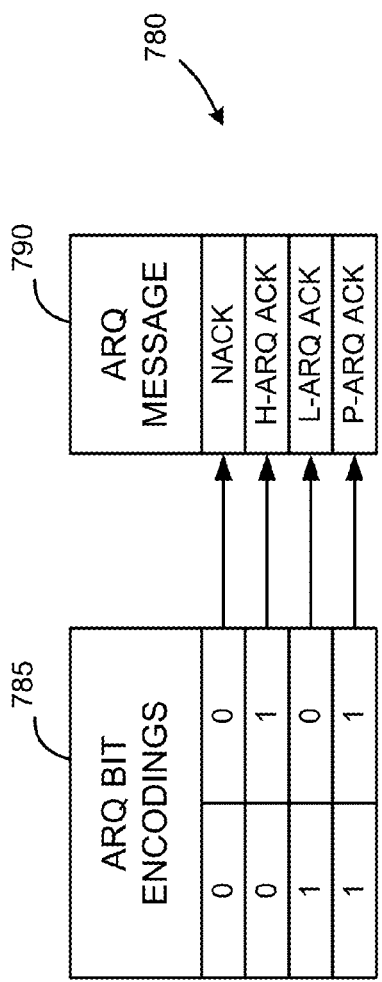
FIG. 7C is an illustration of a bitwise encoding of information in accordance with an exemplary embodiment.

FIG. 7C depicts a set of exemplary mappings 780 of ARQ bit encodings 785 to ARQ messages 790. Thus, for instance, an ARQ bit encoding 785 of 00 indicates a NACK message while an ARQ bit encoding 785 of 10 indicates an L-ARQ ACK message. These encodings use only two bits, making them more efficient than representing an H-ARQ, L-ARQ and P-ARQ as three separate bits.

The mapping data depicted in FIGS. 7A, 7B, and 7C is preferably stored in an access node. This mapping data may be statically arranged, or it may be dynamic such that it varies according to network configuration, network conditions or other factors. The mapping data may also be statically or dynamically stored in the client node, or the client node may not store any mapping data and instead parse each AAM to determine if the AAM contains acknowledgement data for the client node.

Figure 8:
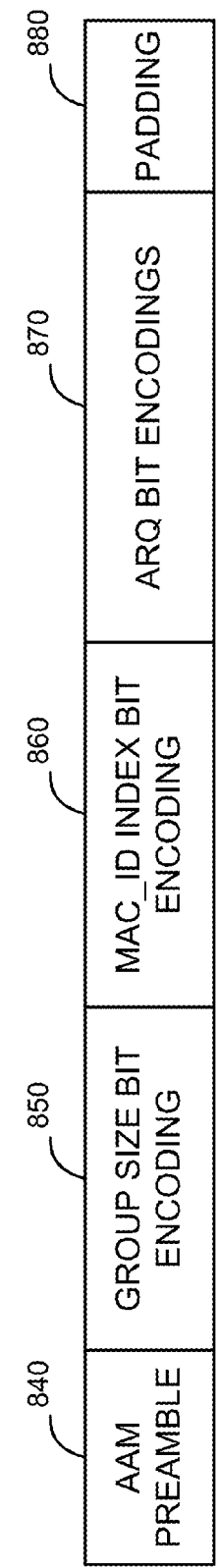
FIG. 8 is an illustration of a message format in accordance with an exemplary embodiment.

FIG. 8 depicts an exemplary binary AAM format 830 comprising an AAM preamble 840, group size bit encoding 850, MAC_ID index bit encoding 860, a series of ARQ bit encodings 870, and padding 880. AAM preamble 840 may comprise a sequence of bits that distinctly identifies the message as an AAM. Group size bit encoding 850 may comprise a series of bits encoding the size of the groups of client nodes. For example, group size bit encoding 850 could use the bit encodings from mapping 700. MAC_ID index bit encoding 860 may comprise a series of bits encoding the MAC_ID range of client nodes in a group. For example, MAC_ID index bit encoding 860 could use the bit encodings from mapping 750. ARQ bit encodings 870 may comprise one or more representations of ARQ data. Preferably ARQ bit encodings 870 are arranged to represent an ARQ message for each client node that is assigned a MAC_ID from the range defined by group size bit encoding 850 and MAC_ID index bit encoding 860. Additionally, it is advantageous for these ARQ messages to be arranged sequentially according to the MAC_IDs of the client nodes. Furthermore each ARQ message may comprise a series of bits encoding an ARQ message according to mapping 780. Thus, the first two bits of ARQ bit encodings 870 may represent an ARQ message transmitted to a first client node, the next two bits of ARQ bit encodings 870 may represent an ARQ message transmitted to the next client node in the sequential order of the client node's MAC_IDs, and so on. Finally, padding 880 may comprise a number of bits required to pad the length of an given AAM to a certain number of bits, for example 128 bits.

Figure 9:
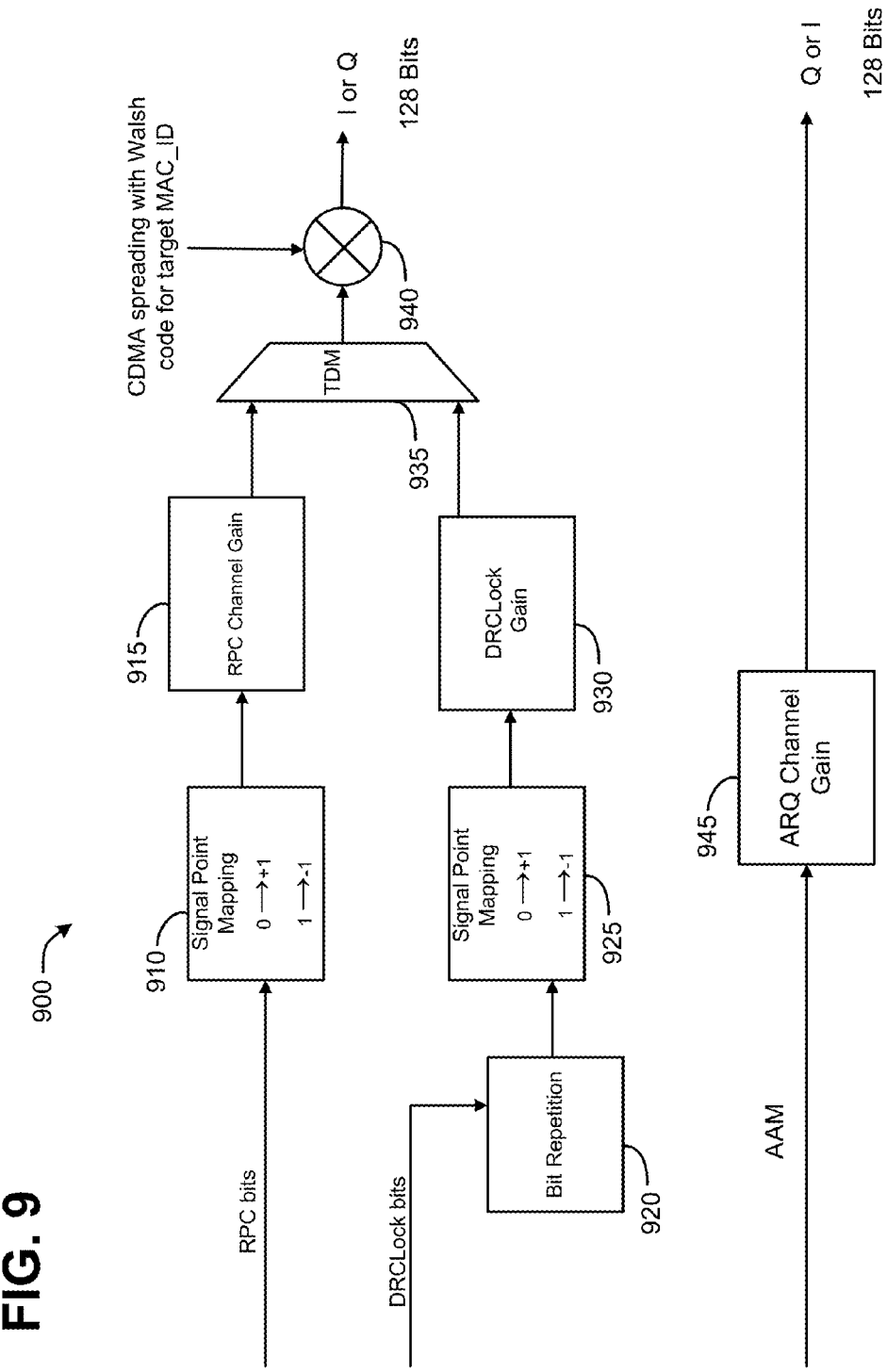
FIG. 9 is a signal flow schematic illustrating a method for transmitting aggregated acknowledgements on a CDMA medium access control channel.

FIG. 9 depicts a method 900 for transmitting an AAM on a CDMA MAC channel. In particular, FIG. 9 provides a representation of how the RPC and DRCLock bits are multiplexed and encoded on a CDMA MAC channel in the forward direction to a particular target client node, while the AAM bits are transmitted to all client nodes in a group.

In FIG. 9, an RPC bit stream serves as input to a signal point mapping function 910, while a DRCLock bit stream, after being passed through bit repetition function 920, serves as input to signal point mapping function 925. The purpose of signal point mapping functions 910 and 925 is to transform a binary bit stream into a format in accordance with CDMA encoding by converting zeros (0) into ones (1) and converting ones (1) into negative ones (−1).

After the bit streams are converted in signal point mapping functions 910 and 925, they are passed through channel gain functions 915 and 930, respectively. Outputs from channel gain functions 915 and 930 are combined by time-division multiplexor 935, then transmitted to a CDMA spreader 940, where the signal is spread using the Walsh code associated with the target client node's MAC_ID. CDMA spreader 940 uses 128-bit Walsh codes in order to support the 128 possible MAC_IDs in EVDO Rev. A. The 128 bits of output from CDMA spreader 940 are modulated onto either the in-phase (I) or the quadrature-phase (Q) components of the carrier frequency. Preferably, the 128 bits of output are modulated onto the I component of the carrier frequency if the target client node's MAC_ID is even, and modulated onto the Q component of the carrier frequency if the target client node's MAC_ID is odd.

An AAM bit stream, preferably arranged according to AAM format 830 and comprising 128 bits, serves as input into ARQ channel gain function 945. The 128-bit output from ARQ channel gain function 945 is modulated onto either the I or Q components of the carrier frequency without being spread according to CDMA procedures. Preferably, the 128-bit output is modulated onto either the I or Q component of the carrier frequency based on which of these phase components is not being used by the output of CDMA spreader 940.

As described earlier, if each of 56 client nodes transmit a sub-packet at approximately the same time, the access node must transmit 14,336 bits of hybrid ARQ information on a MAC channel, across 56 different ARQ messages. Assume that, using method 900 to transmit AAM messages formatted according to AAM format 830, all 56 client nodes are assigned to the same group and all 56 client nodes transmit sub-packets at approximately the same time. Then, the 128-bit output of CDMA spreader 940 is transmitted on a MAC channel to each respective client node, but the 128-bit AAM message is transmitted on a MAC channel just once, and is preferably received by all 56 client nodes. Thus, the total number of bits required for transmitting acknowledgements is reduced to 7,296 bits through use of the AAM scheme introduced herein. However, significant reductions in the number of bits required for transmitting acknowledgements to client nodes can be achieved even if the client node group size is smaller than 56.

An AAM may also contain control bits transmitted from an access node to a group of client nodes. For example, the CDMA RPC bits and DRCLock bits for each client node in a given group of can be represented as a series of bits in binary AAM format 830. The control bits may appear before, after, or interleaved with ARQ bit encodings 870. Regardless of their exact position in an AAM, in an ACM that contains control bits, the control bits are preferably ordered according to the numbering of the client nodes' MAC_IDs. Thus, when receiving an AAM containing control bits, a client node will know where within the AAM to find its control bits.

Alternatively, control bits for multiple client nodes can be combined into a separate aggregated control message (ACM) and either broadcast or multicast to all client nodes in the group independently from the AAM. Similar to the methods and encodings described in FIGS. 7A, 7B, 7C, 8, and 9, control bits can be aggregated into an ACM and transmitted to a group of client nodes without spreading the ACM signals with a CDMA Walsh code. An ACM may include control bits that are distinct for each client node in a given group, or control bits that are identical for all client nodes in a given group.

In cases where each of the client nodes in a given group are to be transmitted distinct control bits, these bits may represented as a series of control bits in an ACM. For example, the CDMA RPC bits and DRCLock bits for each client node in a given group of can be represented as a series of bits in a format analogous to binary AAM format 830. In an ACM that contains control bits, the control bits are preferably ordered according to the numbering of the client nodes' MAC_IDs. Thus, when receiving an ACM containing control bits, a client node will know where within the ACM to find its control bits.

In cases where all of the client nodes in a given group are to be transmitted identical control bits, these bits may represented as a single set of control bits in an ACM. All client nodes that receive such an ACM will preferably retrieve the same control bits from the ACM.

Furthermore, the AAM and ACM techniques described herein can operate independently of, or in conjunction with, one another. In other words, for a given group of client nodes, an access node may transmit (1) an AAM, (2) an ACM, (3) both an AAM and an ACM, or (4) neither an AAM nor an ACM.

Exemplary embodiments have been described above. Those skilled in the art will understand, however, that changes and modifications may be made to these embodiments without departing from the true scope and spirit of the invention, which is defined by the claims.

What is claimed is:

1. A method for aggregated acknowledgment of received packets in a communication system, wherein the communication system includes an access node and a plurality of client nodes communicatively served by the access node, wherein each client node is distinguished by a respective client node identifier that is unique within the plurality of client nodes, the method comprising:
    maintaining a division of the plurality of client nodes into two or more client node groups based on each client node's client node identifier, wherein, in each group, the client nodes of the group are distinguished by respective sets of client node identifiers that are arranged in a sequential and contiguous order, and wherein each group includes at least two client nodes;
    determining, by the access node, that the access node received respective packets from all client nodes in a given group of the two or more client node groups within a predetermined time period; and
    responsive to the access node determining that respective packets were received from all client nodes in the given group within the predetermined time period, the access node transmitting, to all client nodes in the given group, a single aggregated acknowledgment message (AAM) comprising a series of acknowledgment indicators arranged in the sequential order of the client node identifiers of the client nodes in the given group, wherein each acknowledgment indicator distinctly (i) corresponds to the respective client node whose client node identifier has the same position in the sequential order as the acknowledgment indicator and (ii) acknowledges the respective packet received by the access node from the respective client node.

2. The method of claim 1, wherein the AAM further comprises:
    a preamble indicating that the AAM contains aggregated acknowledgments; and
    a group identifier indicating the given group of client nodes to which the acknowledgments relate.

3. The method of claim 2, wherein the group identifiers of each group of client nodes are numbered sequentially based on the unique client node identifiers of the client nodes within each group.

4. The method of claim 1, wherein the access node transmits an indication of the group identifier to each client node in the given group of client nodes.

5. The method of claim 1, further comprising:
    a client node in the given group receiving the AAM; and
    the client node in the given group locating the respective acknowledgment indicator of the client node based upon the client node's unique client node identifier.

6. The method of claim 5, wherein the unique client node identifiers are medium access control identifiers (MAC_IDs).

7. The method of claim 1, wherein the communication system is a wireless network, the client nodes are wireless communication devices, and the access node is a component of a radio access network.

8. The method of claim 7, wherein the communication system operates in accordance with Code Division Multiple Access (CDMA), wherein the AAM is transmitted in within a phase of a modulation cycle, and wherein the AAM is directed to more than one client node by not performing CDMA spreading procedures on the AAM.

9. The method of claim 8, wherein the unique client node identifiers are MAC_IDs, and wherein the AAM further contains a series of control bits, including CDMA reverse power control (RPC) bits and CDMA data request channel lock (DRCLock) bits, wherein the series of control bits is ordered according to the MAC_IDs of the client nodes in the given group, whereby each client node can determine its respective control bits based upon the client node's MAC_ID.

10. The method of claim 8, further comprising:
    determining, by the access node, that the access node received respective packets from less than all client nodes in a second given group of the two or more client node groups within a second predetermined time period; and
    responsive to the access node determining that respective packets were received from less than all client nodes in the given group within the predetermined time period, the access node transmitting separate acknowledgments to the client nodes in the second given group, wherein CDMA spreading procedures are performed on each of the separate acknowledgments.

11. The method of claim 1, wherein the client nodes transmit packets in accordance with a hybrid automatic repeat request protocol and the access node transmits acknowledgment messages in accordance with a hybrid automatic repeat request protocol.

12. The method of claim 11, wherein the pre-determined time period is defined by a packet and acknowledgment transmission cycle of the hybrid automatic repeat request protocol.

13. A communication system supporting aggregated acknowledgment of received packets, the system comprising:
    a plurality of client nodes, wherein each client node is distinguished by a respective client node identifier that is unique within the plurality of client nodes, wherein each client node is assigned to a group based on its unique client node identifier, and wherein, in each group, the client nodes of the group are distinguished by respective sets of client node identifiers that are arranged in a sequential and contiguous order;
    an access node communicatively serving the plurality of client nodes, storing data representing the assignment of the client nodes to the groups and storing program instructions executable by a processor to:

determine that the access node received respective packets from all client nodes in a given group of the two or more client node groups within a predetermined time period; and responsive to determining that respective packets were received from all client nodes in the given group within the predetermined time period, transmitting, to all client nodes in the given group, a single aggregated acknowledgment message (AAM) comprising a series of acknowledgment indicators arranged in the sequential order of the client node identifiers of the client nodes in the given group, wherein each acknowledgment indicator distinctly (i) corresponds to the respective client node whose client node identifier has the same position in the sequential order as the acknowledgment indicator and (ii) acknowledges the respective packet received by the access node from the respective client node.

14. The communication system of claim 13, wherein the AAM further comprises:

a preamble indicating that the AAM contains aggregated acknowledgments; and a group identifier indicating the given group of client nodes to which the acknowledgments relate.

15. The communication system of claim 13, wherein the access node transmits an indication of the group identifier to each client node in the given group of client nodes.

16. The communication system of claim 13, wherein the communication system is a wireless network, the client nodes are wireless communication devices, and the access node is a component of a radio access network.

17. The communication system of claim 16, wherein the communication system operates in accordance with Code Division Multiple Access (CDMA), wherein the AAM is transmitted in within a phase of a modulation cycle, and wherein the AAM is directed to more than one client node by not performing CDMA spreading procedures on the AAM.

18. The communication system of claim 17, wherein the unique client node identifiers are MAC_IDs, and wherein the AAM further contains a series of control bits, including CDMA reverse power control (RPC) bits and CDMA data request channel lock (DRCLock) bits, wherein the series of control bits is ordered according to the MAC_IDs of the client nodes in the given group, whereby each client node can determine its respective control bits based upon the client node's MAC_ID.

19. The communication system of claim 18, wherein the program instructions are further executable by the processor to:

determine that the access node received respective packets from less than all client nodes in a second given group of the two or more client node groups within a second predetermined time period; and responsive to the access node determining that respective packets were received from less than all client nodes in the given group within the predetermined time period, transmit separate acknowledgments to the client nodes in the second given group, wherein CDMA spreading procedures are performed on each of the separate acknowledgments.

20. The communication system of claim 13, wherein the pre-determined time period is defined by a packet and acknowledgment transmission cycle of a hybrid automatic repeat request protocol.

* * * * *